(12) United States Patent
Lee et al.

(10) Patent No.: US 7,445,200 B2
(45) Date of Patent: Nov. 4, 2008

(54) GAS-LIQUID CONTACTOR BAFFLE

(75) Inventors: Adam T. Lee, Dallas, TX (US);
Kuang-Yeu Wu, Plano, TX (US); Larry W. Burton, Waxahachie, TX (US); Karl Tze-Tang Chuang, Edmonton (CA)

(73) Assignee: AMT International, Inc., Richardson, TX (US)

( * ) Notice: Subject to any disclaimer, the term of this patent is extended or adjusted under 35 U.S.C. 154(b) by 393 days.

(21) Appl. No.: 11/318,189

(22) Filed: Dec. 23, 2005

(65) Prior Publication Data

US 2007/0145611 A1   Jun. 28, 2007

(51) Int. Cl.
*B01F 3/04* (2006.01)

(52) U.S. Cl. .................... 261/112.2; 261/114.1; 96/190; 96/356; 96/360

(58) Field of Classification Search ............. 261/112.2, 261/114.1; 96/189, 190, 356, 358, 360
See application file for complete search history.

(56) References Cited

U.S. PATENT DOCUMENTS

| | | | | |
|---|---|---|---|---|
| 1,047,765 | A | * | 12/1912 | Derby ..................... 96/356 |
| 1,647,281 | A | * | 11/1927 | Doyle ..................... 261/114.1 |
| 3,218,048 | A | | 11/1965 | Smith et al. |
| 3,450,393 | A | | 6/1969 | Munters |
| 3,647,192 | A | | 3/1972 | DeGroot et al. |
| 3,729,179 | A | | 4/1973 | Keller |
| 3,747,905 | A | | 7/1973 | Nutter |
| 3,887,665 | A | | 6/1975 | Mix et al. |
| 3,912,471 | A | * | 10/1975 | Cotton, Jr. ............... 55/440 |
| 3,959,419 | A | | 5/1976 | Kitterman |
| 4,105,723 | A | | 8/1978 | Mix |
| 4,132,761 | A | | 1/1979 | Mix |

(Continued)

FOREIGN PATENT DOCUMENTS

EP   0 250 020 A2   12/1987

(Continued)

OTHER PUBLICATIONS

Chen, Gilbert K., "Packed Column Internals", *Chemical Engineering*, Mar. 5, 1984, © 1984 by McGraw-Hill Inc., pp. 40-51.

(Continued)

*Primary Examiner*—Scott Bushey
(74) *Attorney, Agent, or Firm*—Davis Bujold & Daniels, P.L.L.C.

(57) ABSTRACT

A gas-liquid contactor baffle includes a body having a first portion, a second portion and a middle portion, the middle portion being positioned between the first portion and the second portion. The middle portion is a corrugated sheet having a first face and a second face. The corrugated sheet has alternating ridges and open ended channels extending across each of the first face and the second face between the first portion and the second portion. The first portion has a first collection channel adapted to collect liquids from the open ended channels of the middle portion when flow is along the first face in a first direction. The second portion having a second collection channel adapted to collect liquids from the open ended channels of the middle portion when flow is along the second face in a second direction.

11 Claims, 8 Drawing Sheets

U.S. PATENT DOCUMENTS

| | | | |
|---|---|---|---|
| 4,218,408 A * | 8/1980 | Henning et al. | 261/112.2 |
| 4,225,188 A * | 9/1980 | McGuire et al. | 299/64 |
| 4,274,923 A | 6/1981 | Mahar | |
| 4,300,918 A | 11/1981 | Cary | |
| 4,528,068 A | 7/1985 | Fiocco et al. | |
| 4,563,314 A * | 1/1986 | Ernst et al. | 261/153 |
| 4,597,916 A | 7/1986 | Chen | |
| 4,603,022 A | 7/1986 | Yoneda et al. | |
| 4,604,247 A | 8/1986 | Chen et al. | |
| 4,818,346 A | 4/1989 | Bentham et al. | |
| 4,842,778 A | 6/1989 | Chen et al. | |
| 4,950,430 A | 8/1990 | Chen et al. | |
| 4,954,294 A | 9/1990 | Bannon | |
| 4,990,167 A * | 2/1991 | Stehning | 96/228 |
| 5,139,544 A | 8/1992 | Lucero et al. | |
| 5,192,466 A | 3/1993 | Binkley | |
| 5,213,719 A | 5/1993 | Chuang | |
| 5,244,604 A | 9/1993 | Miller et al. | |
| 5,262,094 A | 11/1993 | Chuang et al. | |
| 5,269,976 A | 12/1993 | Biddulph et al. | |
| 5,277,847 A | 1/1994 | Gentry et al. | |
| 5,300,131 A * | 4/1994 | Richard | 96/297 |
| 5,366,666 A | 11/1994 | Chuang et al. | |
| 5,389,343 A | 2/1995 | Gentry | |
| 5,439,510 A | 8/1995 | Lerner | |
| 5,453,222 A | 9/1995 | Lee et al. | |
| 5,454,989 A | 10/1995 | Nutter | |
| 5,514,193 A * | 5/1996 | Schaal et al. | 96/356 |
| 5,554,329 A | 9/1996 | Monkelbaan et al. | |
| 5,653,786 A * | 8/1997 | Taylor et al. | 95/268 |
| 5,707,563 A | 1/1998 | Monkelbaan et al. | |
| 5,762,668 A | 6/1998 | Lee et al. | |
| 5,809,981 A * | 9/1998 | Berg-Sonne | 123/563 |
| 5,837,105 A | 11/1998 | Stober et al. | |
| 5,972,171 A | 10/1999 | Ross et al. | |
| 5,975,504 A | 11/1999 | Nutter et al. | |
| 6,053,484 A | 4/2000 | Fan et al. | |
| 6,059,934 A | 5/2000 | Stober et al. | |
| 6,076,813 A | 6/2000 | Yeoman et al. | |
| 6,287,367 B1 | 9/2001 | Buchanan et al. | |
| 6,293,527 B1 * | 9/2001 | Ovard | 261/111 |
| 6,293,528 B1 * | 9/2001 | Monkelbaan et al. | 261/114.1 |
| 6,371,455 B1 | 4/2002 | Lee et al. | |
| 6,588,735 B2 | 7/2003 | Bosmans et al. | |
| 6,817,596 B2 | 11/2004 | Fischer | |

FOREIGN PATENT DOCUMENTS

| | | |
|---|---|---|
| GB | 1065554 | 4/1967 |

OTHER PUBLICATIONS

Wankat, Phillip C., "4.2 Distillation Equipment", *Equilibrium Staged Separations*, PTR Prentice Hall, © 1988, pp. 94-96.

Chen, Gilbert. "Packed column internals.", Chemical Engineering, pp. 40-51, Mar. 5, 1984.

Lockettt, M. J., "Distillation tray fundamentals", Cambridge University Press, Cambridge, England, c. 1986, pp. 178-186.

Wankat, Phillip C., "Equilibrium staged separations", Elsevier, New York, USA, c. 1988, pp. 372-379.

Kister, Henry Z., "Distillation Design", McGraw-Hill, Inc., 1992, pp. 382-389.

Wijn, E. F., "The effect of downcomer layout pattern on tray efficiency", published in *The Chemical Engineering Journal*, Jan. 30, 1996, vol. 63, pp. 167-180.

Stichlmair, Johann G. et al., "Distillation: Principles and Practices", Wiley-VCH, New York, USA, c. 1998, pp. 386-389.

Uop, Brochure entitled "Trays for Distillation, Absorption, Stripping and Extraction" (undated).

King, C. Judson, "Separation Process", McGraw Hill Book Company, 1980, 2d edition, pp. 614, 619.

Kister, Henry C., "Distillation Design", McGraw-Hill Inc., 1992, p. 383.

* cited by examiner

GAS-LIQUID CONTACTOR BAFFLE

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to a gas-liquid contactor baffle used to improve gas-liquid contact for mass transfer in a tray tower.

BACKGROUND OF THE INVENTION

1. Field of the Invention

The present invention relates to chemical process towers and, more particularly, but not by way of limitation, to a de-entrainment/mass transfer assembly for a tray tower, the trays having baffles, for increasing tray capacity and improving mass transfer efficiency therein.

2. Description of Related Art

It is a continuing goal to improve the efficiency of separation processes and like processes that are conducted using chemical process towers. To this end, many different approaches have been undertaken.

Separation processes that can be performed in chemical process towers include distillation and absorption. The optimum design of a tower having trays ensures maximum throughput (i.e. capacity) and mass transfer efficiency. At high throughput there is a tendency for liquid to be entrained at high gas velocity. This reduces the capacity as well as efficiency, both caused by the liquid blowing to the tray above. It is an objective of the present invention to effectively remove the entrainment.

Distillation and absorption towers are utilized to separate selected components from a multicomponent stream. Generally, such gas-liquid contact towers utilize either trays or packings, and sometimes combinations thereof. In the case of tray towers, any wetted solid surfaces will improve mass transfer through additional intimate contact between liquid and gas phases. There will be further advantage if the solid surface can also serve as a de-entrainment device.

Distillation trays come in two configurations: cross-current (cross-flow) and counter-current (dual-flow). The trays generally consist of a solid tray or deck having a plurality of apertures perforating the deck and are installed on support rings secured within the tower. In cross-current trays, gas ascends through the apertures and contacts the liquid moving across the tray through the "active" area thereof. It is in this area liquid and gas mix and fractionation occurs. The liquid is directed onto the tray by means of a vertical channel from the tray above. This channel is generally referred to as the inlet downcomer. The liquid moves across the tray and exits through a similar channel generally referred to as the exit downcomer. It is the active area of the tray which most directly effects gas liquid contact and thus mass transfer efficiency.

In the case of dual-flow trays, the tray deck covers the entire cross-sectional area of the tower. Gas and liquid flow through the same apertures, and contact in counter-current manner. Thus, there is no need for downcomers.

A problem common in the art is that of entrainment of spray in the gas. When spray is entrained in the rising gas it is carried to higher trays, thus affecting the composition of the mixture at those trays, with the consequence that the efficiency of separation of the components in the process mixture is compromised. The gas flow rate may be reduced in order to reduce the entrainment effect, but a consequence is that the tray throughput is also reduced. Another detrimental effect is that the entrained liquid accumulates on the tray above and there is increased amount of liquid on that tray, thus causing premature flooding or reduction in the capacity.

Improvements have been targeted for the technology of gas-liquid contact trays of the type discussed above to address throughput and mass transfer efficiency issues. Examples of this technology are seen in several prior art patents, which include U.S. Pat. Nos. 3,955,419, 4,604,247 and 4,597,916, each assigned to Glitsch, Inc. and U.S. Pat. No. 4,603,022 issued to Mitsubishi Jukogyo Kabushiki Kaisha of Tokyo, Japan. Other performance aspects are addressed in the prior art by the use of baffles, plates and de-entrainment devices. For example, U.S. Pat. Nos. 4,105,723 and 4,132,761, both assigned to Merricks Corporation, address special baffle and de-entrainment structures which are placed within a process tower.

Chuang et al. in U.S. Pat. No. 5,262,094 teach the utilization of a bed of packing material disposed beneath a fractionation tray for de-entraimnent. Further examples of de-entrainment performed using packing below trays are described by, for example, Monkelbaan et al. in U.S. Pat. Nos. 5,554,329 and 5,707,563, and by Nutter et al. in U.S. Pat. No. 5,975,504. Several other types of de-entrainment devices are described by, for example, Mahar in U.S. Pat. No. 4,274,923, Bentham in U.S. Pat. No. 4,818,346, Stober et al. in U.S. Pat. Nos. 5,837,105 and 6,059,934, and Ross et al. in U.S. Pat. No. 5,972,171. In another example, Lee et al. in U.S. Pat. No. 5,762,668 use a structured packing assembly to reduce entrainment in a chemical process tower and improve mass transfer efficiency.

However, when de-entrainment is performed using chevron types of demisting device or structured packings, the wetted surfaces of these devices are in direct contact with high velocity gas streams, resulting in re-entrainment of the liquid. This reduces the effectiveness of these devices for de-entrainment.

SUMMARY OF THE INVENTION

According to the present invention there is provided a gas-liquid contactor baffle which includes a body having a first portion, a second portion and a middle portion, the middle portion being positioned between the first portion and the second portion. The middle portion is a corrugated sheet having a first face and a second face. The corrugated sheet has alternating ridges and open ended channels extending across each of the first face and the second face between the first portion and the second portion. The first portion has a first collection channel adapted to collect liquids from the open ended channels of the middle portion when flow is along the first face in a first direction. The second portion having a second collection channel adapted to collect liquids from the open ended channels of the middle portion when flow is along second face in a second direction.

There will be hereinafter be described how this liquid gas contactor baffle improves effectiveness of de-entrainment and provides additional wetted surface area for enhanced mass transfer. As a result, towers equipped with this apparatus have greatly enhanced capacity and efficiency when compared with the prior art.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Exemplary embodiments of the invention, which are non-limiting, will now be described with reference to FIG. 1 through FIG. 8.

Figure 1:
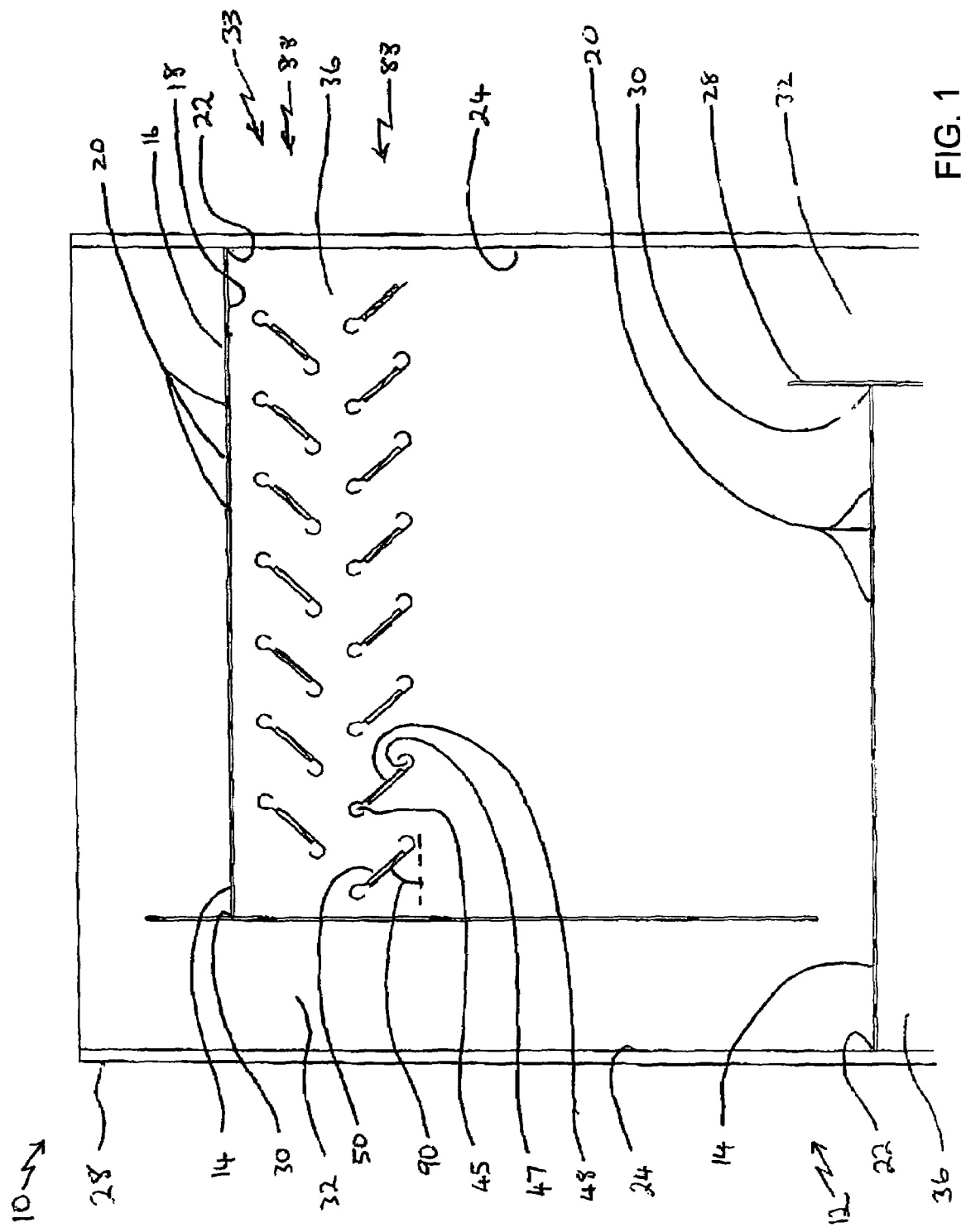
FIG. 1 is a fragmentary, vertical, cross-sectional view of a chemical process showing an illustrative example of positioning of baffles and trays within said tower.

Referring to FIG. 1, an embodiment of the present invention 10 is illustrated. A chemical process tower 12 is fitted with a plurality of trays 14, each tray having a top side 16, a bottom side 18 and apertures 20 extending between bottom side 18 and top side 16. Tray 14 extends for a portion of the width of tower 12. A majority of an edge 22 of tray 14 is adjacent an inside surface 24 of walls 26 of tower 12. A weir 28 is situated along the remaining edge 30 of tray 14, and on the other side of said weir 28 is situated a downcomer 32. An apparatus 33 comprising a plurality of baffles 34 is arrayed in a zone 36 below bottom 18 of tray 14.

Figure 8:
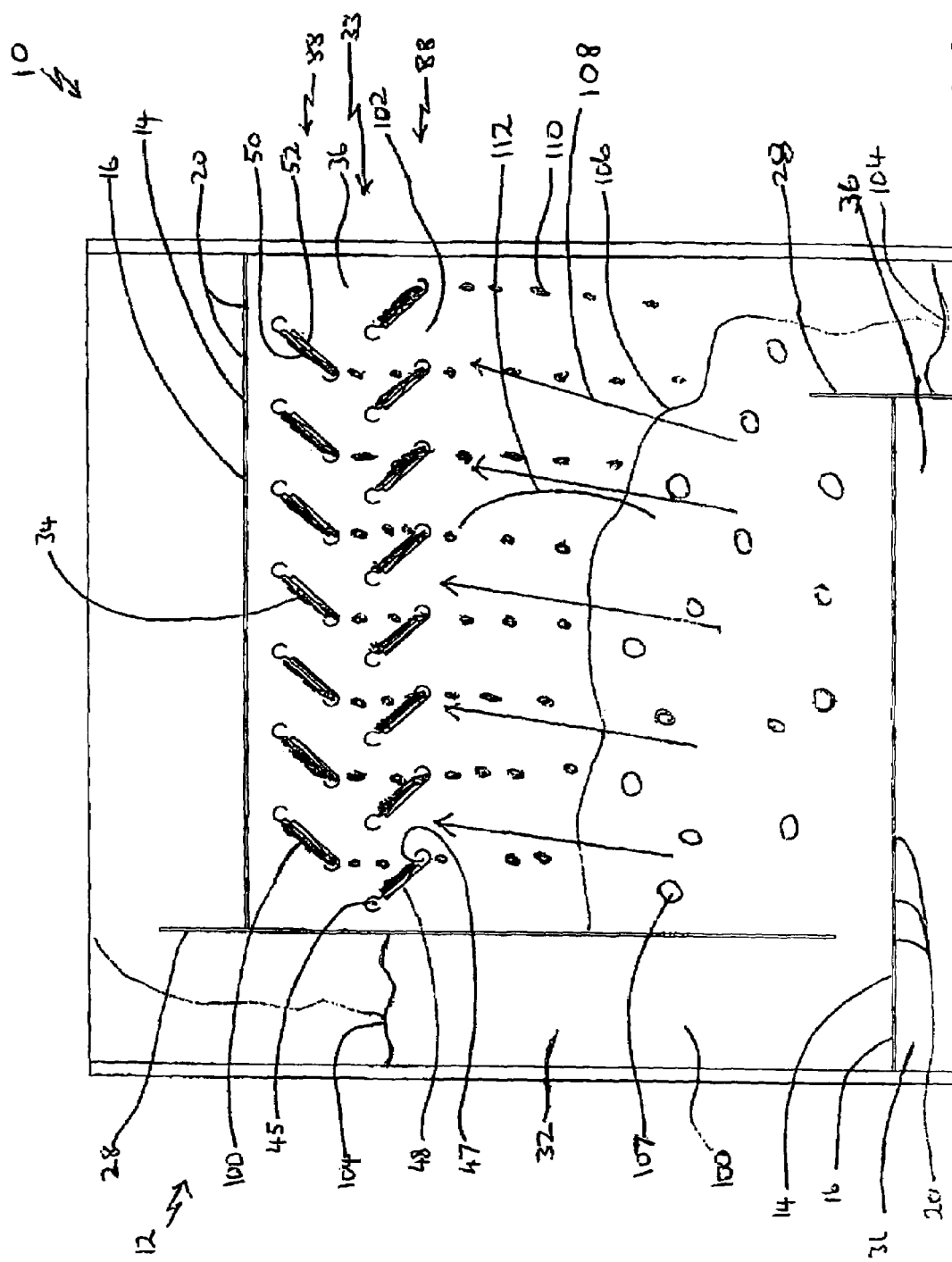
FIG. 8 is a diagram illustrating de-entrainment of spray using the assembly illustrated in FIG. 1.

A preferred embodiment of baffle 34 will now be described with reference to FIGS. 2 and 3. It will be recognized that several aspects of the illustrated embodiment may be altered without deviating from the principles or spirit of the invention, and so the following description is non-limiting. In FIGS. 1 and 8 a cross-current tray design is illustrated. It will be recognized that apparatus 33 of the present invention can also be applied with counter-current trays, commonly known as dual flow trays.

Figure 2:
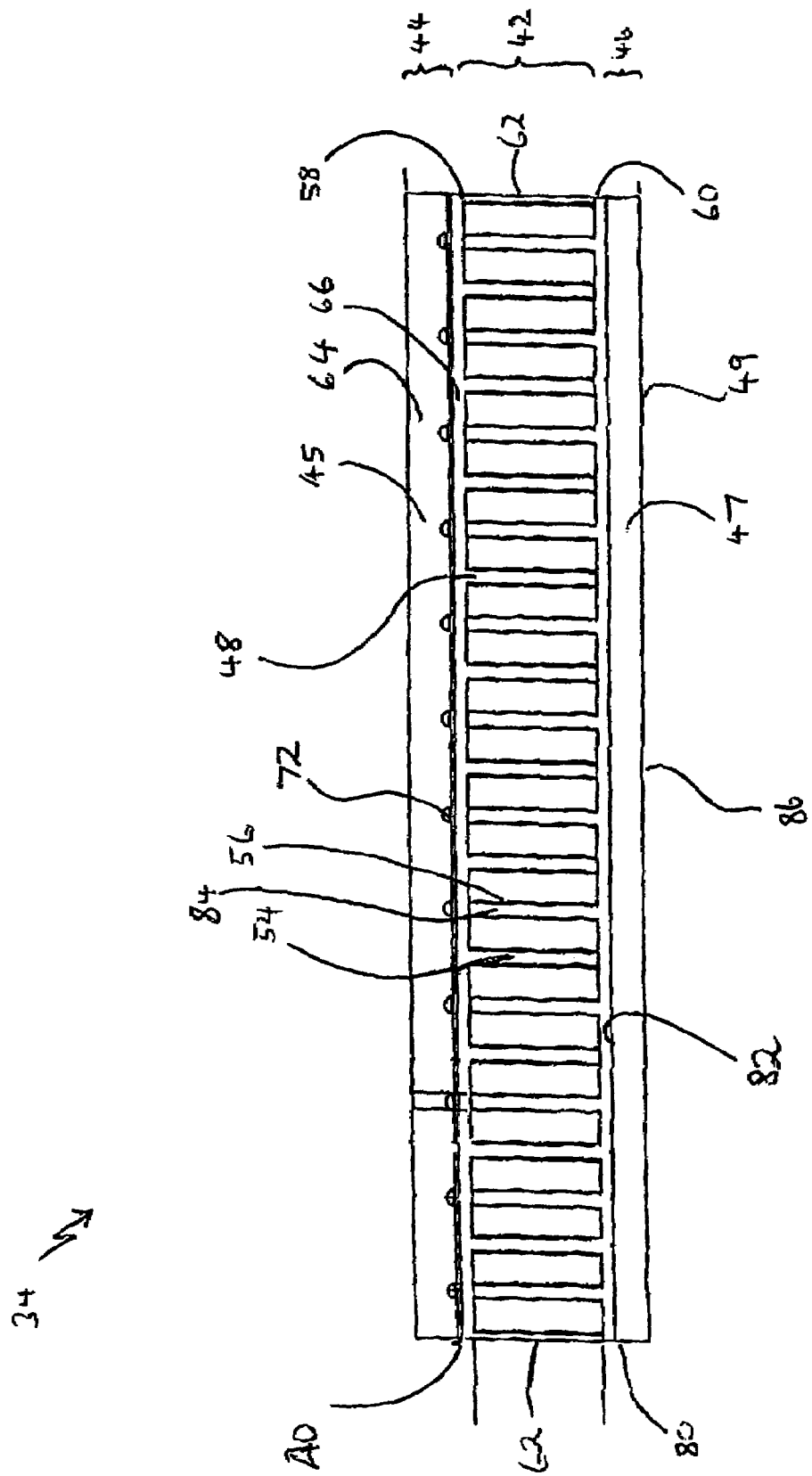
FIG. 2 is a back view of a baffle illustrated in FIG. 1.
Figure 3:
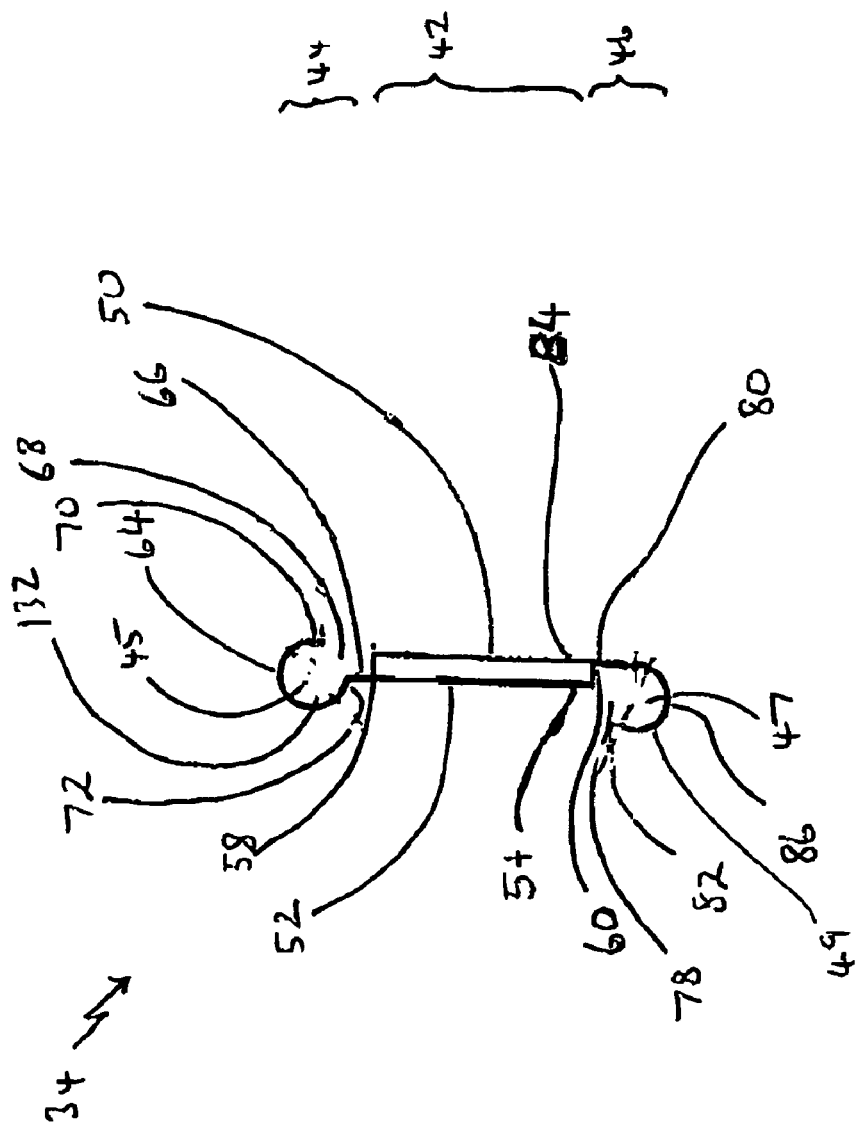
FIG. 3 is a side view of the baffle shown in FIG. 2.

Referring to FIGS. 2 and 3, baffle 34 has a body 40 comprising a middle portion 42, a first or upper portion 44 having a first collection channel 45 and a second or lower portion 46 having a second collection channel 47.

Figure 7:
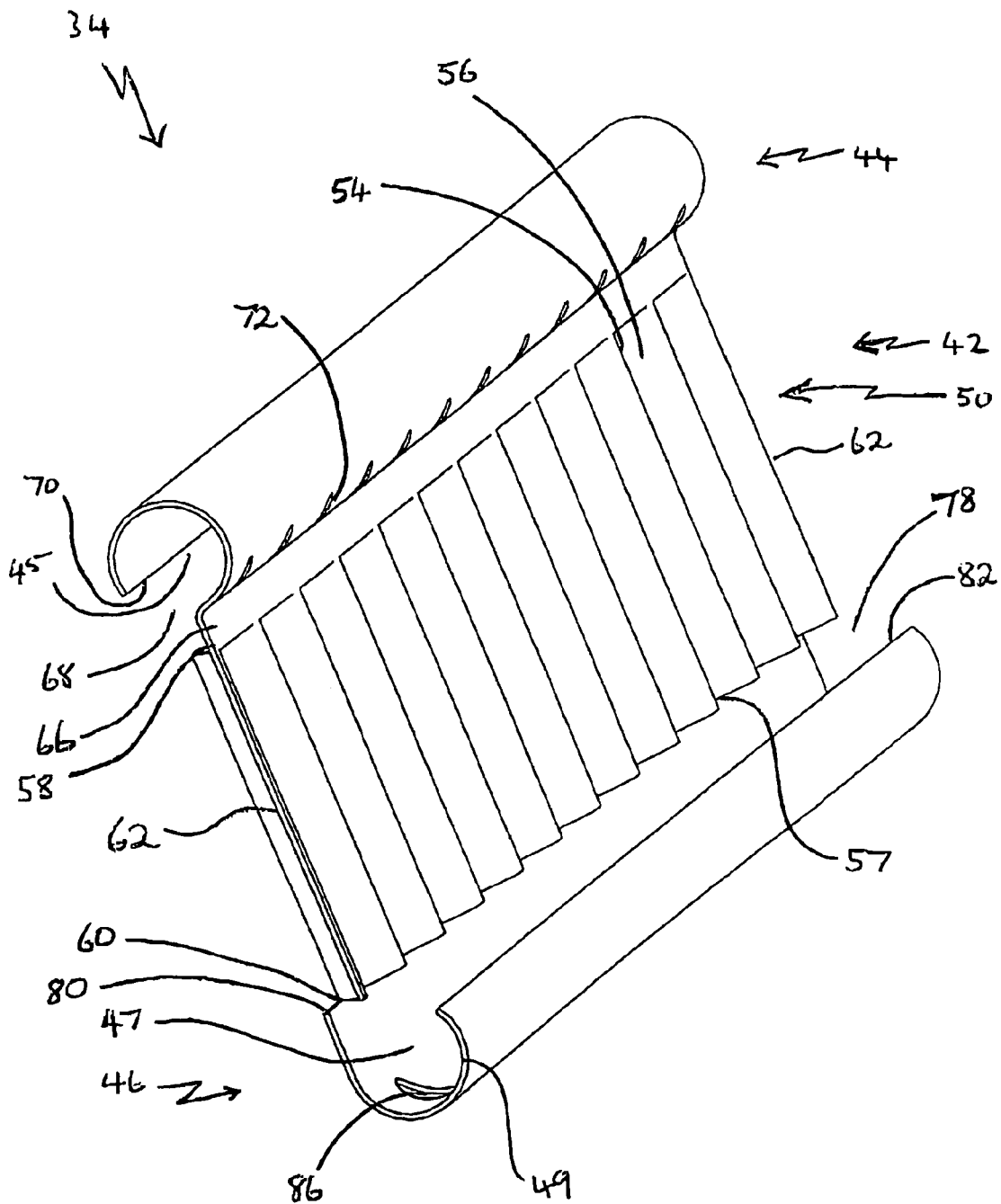
FIG. 7 is a perspective view of the back face of the baffle illustrated in FIG. 2.

Referring to FIG. 3, middle portion 42 comprises a sheet of material 48 having a first face or back face 50 and a second face or front face 52. Referring to FIGS. 2 and 7, sheet 48 is corrugated, as illustrated, or otherwise shaped so as to form a series of approximately parallel ridges 54 with channels 56 therebetween, with discharge holes 57 at the bottom end of channels 56. Ridges 54 and channels 56 extend from a position adjacent top edge 58 to a position adjacent bottom edge 60 of sheet 48, between side edges 62 of sheet 48. It will be recognized that alternative shaping of sheet 48 may be used, including but not limited to concertina shaping, sinusoidal wave patterning, and mixtures of these and other shaping.

Figure 4:
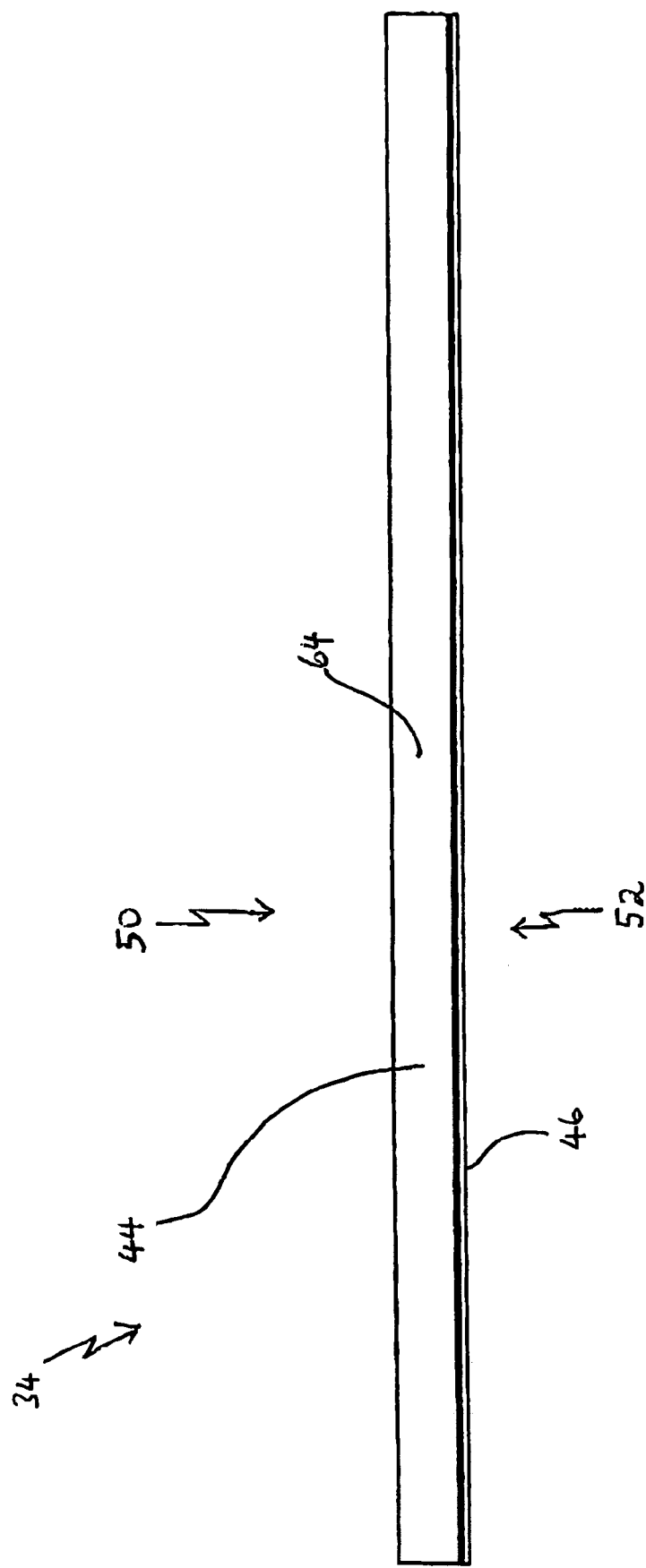
FIG. 4 is a top view of the baffle shown in FIG. 2.

Referring to FIGS. 3 and 4, first or upper portion 44 comprises an upper curved portion 64 that forms first collection channel 45 and a flange 66. Curved portion 64 has an opening 68 extending between flange 66 and distal edge 70 along its full length. Curved portion 64 of first collection channel 45 has a plurality of holes 72 situated adjacent flange 66, through which a liquid may exit first collection channel 45 toward channels 56 in middle portion 42. Advantageously, the number of holes 72 matches the number of channels 56, and each of holes 72 is situated so that liquid passing therethrough flows directly into the corresponding channel 56.

Figure 5:
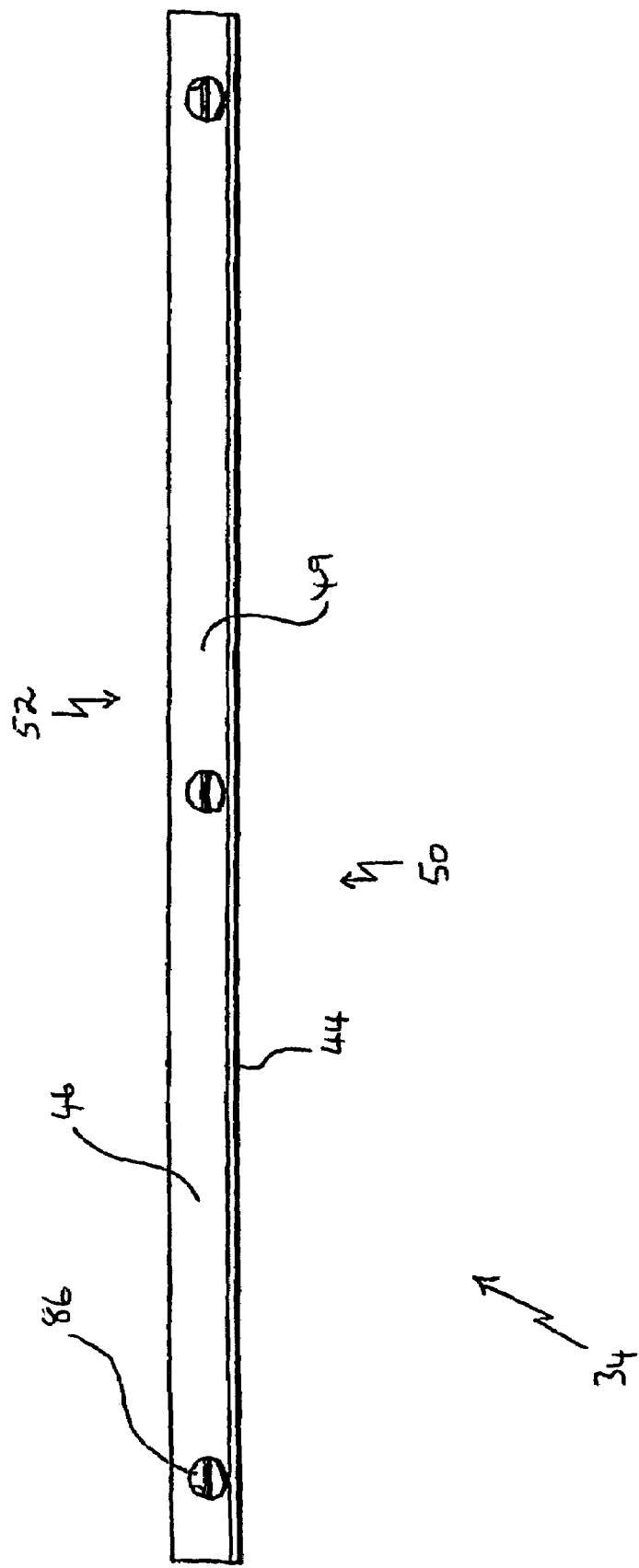
FIG. 5 is a bottom view of the baffle shown in FIG. 2.

Referring to FIG. 3, second or lower portion 46 is shaped so as to form a second collection channel 47. The illustrated embodiment has a curved portion 49 that has a J-shape. It will be recognized that alternative shapes may be used to form second collection channel 47. An opening 78 extends between a first edge 80 adjacent middle portion 42 and a distal second edge 82 along the length of second portion 46. Referring to FIGS. 3 and 5, a plurality of holes 86 perforate the bottom of second or lower portion 46 so that liquid can flow downward out of second collection channel 47 to the area below baffle 34.

Figure 6:
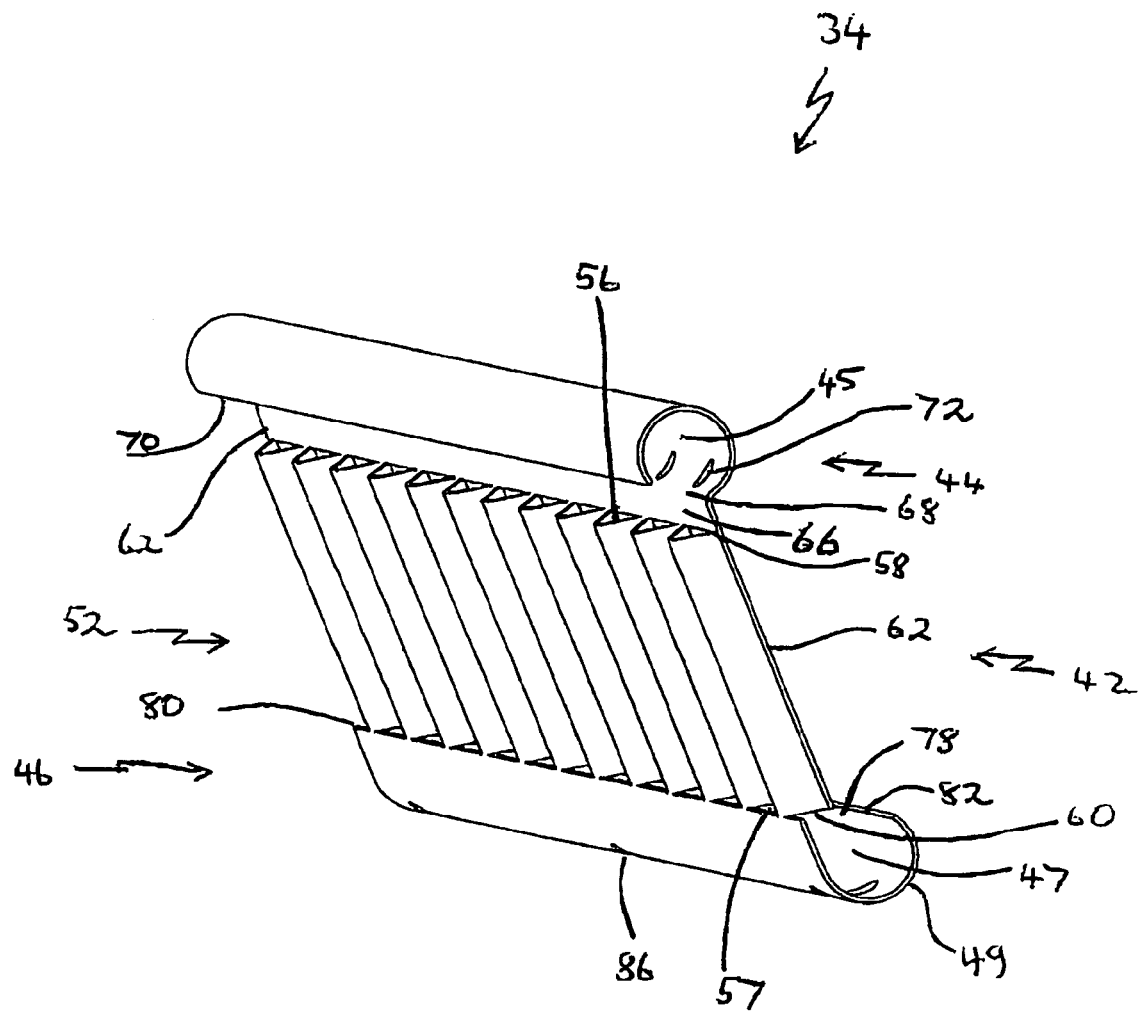
FIG. 6 is a perspective view of the front face of a baffle illustrated in FIG. 2.

Referring to FIGS. 3, 6 and 7, flange 66 of first or upper portion 44 is connected along the length of middle portion 42 at upper ends of ridges 54. First edge 80 of second or lower portion 46 is connected along the length of middle portion 42 at lower ends of bases 84 of channels 56.

Referring again to FIG. 1, baffles 34 are arrayed across the breadth and width of the area of zone 36 of tower 12 below tray 14. Typically, baffles 34 are ranked in parallel so that one baffle 34 in one rank 88 is situated immediately above or below the spacing between two other baffles 34 in another rank 88. Typically baffles 34 are angled relative to both of the principal axis of tower 12 and the plane of tray 14. An angle 90 of the principal plane of baffle 34 relative to the plane of tray 14 is an angle between 5 degrees and 85 degrees. Preferably, baffles 34 in one of ranks 88 are rotated at an angle of 180 degrees relative to baffles 34 in another of ranks 88 immediately above or below the one rank 88.

The method of utilization of apparatus 33 of the present invention will now be described with reference to FIG. 8 for a cross-current tray design. It will be recognized that the operation of a duel flow tray tower having apparatus 33 installed therein is similar.

Apparatus 33 comprising a plurality of baffles 34 is installed in an array having at least one rank 88 below trays 14 in tower 12. When tower 12 is in operation, liquid 100 spills over weir 28 of one tray 14 and descends downcomer 32 toward another tray 14 immediately below the one tray 14. A head of liquid 100, an extent of which is indicated by curved lines 104, is in downcomer 32, and causes liquid 100 to flow across top surface 16 of tray 14 toward and over weir 28. Gas 102 in zone 36 immediately below tray 14 rises through apertures 20 in tray 14 and bubbles through liquid 100. A froth 106 that is formed has an extent indicated by a curved line. As bubbles 107 exit froth 106 they form a spray 108 that travels upward as indicated by arrows. Baffles 34 intercept spray 108. Referring to FIG. 6 through 8, gas 102 containing entrained spray 108 impinges on front face 52 and first collection channel 45 of baffles 34. Droplets of spray 108 coalesce to form liquid 100 on front face 52. Said liquid 100 on front face 52 of middle portion 42 flows in a first direction toward first or upper portion 44, and then passes through holes 72 in first collection channel 45 onto back face 50 and into channels 56 of sheet 48. Liquid 100 descends channels 56 in a second direction toward second or lower portion 46, flows out channels 56 via discharge holes 57, and is collected in second collection channel 47. Liquid 100 exits second collection channel 47 via holes 86 and falls as droplets 110 toward active area 112 below.

Liquid 100 descending channels 56 is not exposed to any high velocity gas 102, and so is not subject to re-entrainment.

Droplets 110 are much larger than spray 108, and so droplets 110 do not become entrained in gas 102.

In this manner, liquid 100 that has been formed into spray 108 is prevented from being entrained in gas 102 and ascending through apertures 20 in tray 14 above.

When compared with operation of trays 14 having no baffles, the surface area of liquid 100 is increased by having liquid 100 flow along channels 56 on back face 50 of baffles 34 and fall as droplets 110, thereby improving mass transfer between liquid 100 and gas 102, and hence enhancing operation of tower 12.

It has been found through monitoring embodiment 10 shown in FIGS. 1 and 8 that spray 108 generated above one tray 14 impinges on front face 52 of middle portion 42 and is directed to form liquid 100 at the back face 50 of middle portion 42 of baffles 34 below another tray 14 immediately above. When the gas rate is small, liquid 100 carried over is collected in corrugated channels 56, flows out through discharge holes 57 downward to second collection channel 47, and subsequently is discharged via holes 86 to fall as droplets 110 into active area 112 below. When the gas rate is high, liquid 100 carried over is pushed upwards and mostly ends up in first collection channel 45. Liquid 100 collected in first collection channel 45 is redirected down via holes 72 and the openings at the top of corrugated sheet 48 to back face 50. Because liquid 100 flowing down on back face 50 of baffle 34 is not subjected to gas flow, spray 108 is eventually redirected to active area 112. As the gas rate continues to increase, some portion of the liquid 100 carried over could be pushed over to the upper rank 88 of baffles 34 which are rotated at a similar angle 90 relative to the horizontal plane but in an opposite direction to angle 90 of the lower rank 88 of baffles 34 when the upper rank 88 is rotated at an angle of 180 degrees to that of the lower rank 88. Further ranks 88 of baffles 34, if present, are similarly rotated relative to each other, and similarly alternate in direction of angle 90. The spray-deflecting function repeats at the upper rank 88 of baffles 34.

Benefits found to accrue from operation of the present invention include: converting tray action from spray regime to froth regime; deflecting spray by collecting it from the front sides of the baffles and routing it to the back sides of the baffles and subsequently discharging it to the active area below, and increasing liquid surface area for additional mass transfer. These beneficial characteristics of the new invention have been shown to result in greater capacity (up to 20%) and higher tray efficiency.

EXAMPLES

Example 1

It has been shown experimentally that a combination of trays 14 with baffles 34 that serve as "spray deflector" can have as much as 15 to 20% more capacity in a weir loading of 0.5 to 5.0 gpm per inch of weir 28 when compared with use of trays alone. The apparatus was tested using different gas rates (C-factor) and liquid weir loadings (WL). When WL was 4.0 gpm/in for standard valve trays separated by 610 mm, the C-factor at capacity increased from 0.39 ft/s to at least 0.46 ft/s when baffles were in place.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A gas-liquid contactor baffle, comprising:

a body having a first portion, a second portion and a middle portion, the middle portion being positioned between the first portion and the second portion;

the middle portions being a corrugated sheet having a back (or first) face and a front (or second) face, the corrugated sheet having alternating ridges and open ended channels situated across each of the first face and the second face, each channel extending between the first portion and the second portion;

the first portion having a first collection channel adapted to collect liquids from the open ended channels of the middle portion when flow is along the first face in a first direction; and the second portion having a second collection channel adapted to collect liquids from the open ended channels of the middle portion when flow is along the second face in a second direction.

2. The liquid gas contactor baffle as defined in claim 1, wherein the first portion is attached to the middle portion at an upper end of the ridges of the back face and the second portion is attached to the middle portion at a bottom end of the open ended channels of the front face.

3. The liquid gas contactor baffle as defined in claim 1, wherein the first collection channel has an opening extending for substantially its entire length, the opening being adapted to permit entry of entrained spray into the first collection channel; and a plurality of axially spaced holes adapted to release liquid collecting in the first collection channel into the open ended channels on the back face of the middle portion.

4. The liquid gas contactor baffle as defined in claim 3, wherein the number of holes in the first collection channel is the same as the number of channels in the middle portion of the baffle, and the holes are aligned closely with said channels, such that liquid exiting one the holes is directed into one of the channels.

5. The liquid gas contactor baffle as defined in claim 1 wherein the second collection channel has an opening extending for substantially its entire length, the opening being adapted to permit liquid flowing down the open ended channel channels in the middle portion to flow into the second collection channel; and a plurality of axially spaced holes so that liquid collecting in the second collection channel falls from the holes as a stream of droplets toward an active gas liquid contact area situated below the baffle.

6. A tray tower using a plurality of the liquid gas contactor baffles as defined in claim 1, the baffles being positioned in the tray tower in a disengagement zone below one of cross-current or counter-current trays such that gas containing spray impinges on the baffles and the spray is thereby de-entrained from the gas before said gas rises to the tray above the baffles.

7. The tray tower as defined in claim 6, wherein the baffles are arrayed in at least one rank in the disengagement zone below a tray.

8. The tray tower as defined in claim 7, wherein there are at least two ranks.

9. The tray tower as defined in claim 8, wherein adjacent ranks among the at least two ranks are rotated at an angle of approximately 180 degrees relative to each other.

10. The tray tower as defined in claim 7, wherein the number of ranks is between one and five.

11. The tray tower as defined in claim 6, wherein each baffle is slanted at an angle between five degrees and eighty-five degrees relative to a horizontal plane, such liquid flows by force of gravity from the first collection channel along the open ended channels of the back face of the middle portion to the second collection channel.

* * * * *